United States Patent
Uka et al.

(10) Patent No.: US 10,325,728 B2
(45) Date of Patent: Jun. 18, 2019

(54) ELECTROLYTIC CAPACITOR AND PRODUCTION METHOD FOR SAME

(71) Applicant: Panasonic Intellectual Property Management Co., Ltd., Osaka (JP)

(72) Inventors: Youichirou Uka, Hyogo (JP); Katsuya Miyahara, Osaka (JP); Hiroshi Kojima, Aichi (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/790,153

(22) Filed: Oct. 23, 2017

(65) Prior Publication Data
US 2018/0047513 A1    Feb. 15, 2018

Related U.S. Application Data

(63) Continuation of application No. PCT/JP2016/001808, filed on Mar. 29, 2016.

(30) Foreign Application Priority Data

Apr. 28, 2015   (JP) ................... 2015-092085

(51) Int. Cl.
*H01G 9/028*   (2006.01)
*H01G 9/15*    (2006.01)
(Continued)

(52) U.S. Cl.
CPC .......... *H01G 9/028* (2013.01); *H01G 9/0032* (2013.01); *H01G 9/0036* (2013.01); *H01G 9/042* (2013.01);
(Continued)

(58) Field of Classification Search
None
See application file for complete search history.

(56) References Cited

U.S. PATENT DOCUMENTS

| | | | | |
|---|---|---|---|---|
| 2008/0007893 | A1* | 1/2008 | Takagi | H01G 9/0036 361/525 |
| 2010/0053848 | A1* | 3/2010 | Kikuchi | H01G 9/028 361/523 |

(Continued)

FOREIGN PATENT DOCUMENTS

| | | |
|---|---|---|
| JP | 2011-253878 | 12/2011 |
| JP | 2013-122015 | 6/2013 |
| WO | 2010/038477 | 4/2010 |

OTHER PUBLICATIONS

International Search Report of PCT application No. PCT/JP2016/001808 dated Jun. 14, 2016.

(Continued)

Primary Examiner — Dion Ferguson
(74) Attorney, Agent, or Firm — McDermott Will & Emery LLP (57) ABSTRACT

An electrolytic capacitor includes an anode body having a dielectric layer, a first conductive polymer layer covering at least a part of the dielectric layer, and a second conductive polymer layer covering at least a part of the first conductive polymer layer. The first conductive polymer layer includes a first conductive polymer and a first polymer dopant having a sulfonate group. The second conductive polymer layer includes a second conductive polymer and a second polymer dopant having a sulfonate group. A polymerization degree of the first conductive polymer is lower than a polymerization degree of the second conductive polymer.

14 Claims, 1 Drawing Sheet

(51) Int. Cl.
  *H01G 9/00*   (2006.01)
  *H01G 9/042*  (2006.01)
  *H01G 11/48*  (2013.01)
  *H01G 11/56*  (2013.01)
  *H01G 9/052*  (2006.01)

(52) U.S. Cl.
  CPC .............. *H01G 9/15* (2013.01); *H01G 11/48* (2013.01); *H01G 11/56* (2013.01); *H01G 9/052* (2013.01)

(56) References Cited

U.S. PATENT DOCUMENTS

| | | | |
|---|---|---|---|
| 2010/0103590 A1* | 4/2010 | Saida | C08G 61/126 361/525 |
| 2011/0019340 A1* | 1/2011 | Nobuta | C08K 5/053 361/525 |
| 2011/0171366 A1 | 7/2011 | Ning et al. | |
| 2012/0127634 A1* | 5/2012 | Sugihara | H01G 9/0036 361/525 |
| 2012/0212880 A1* | 8/2012 | Ishimaru | H01G 9/028 361/530 |
| 2013/0163149 A1 | 6/2013 | Nobuta et al. | |
| 2013/0177701 A1 | 7/2013 | Ning et al. | |
| 2013/0320260 A1* | 12/2013 | Shimamura | C07D 265/22 252/299.61 |
| 2014/0168858 A1* | 6/2014 | Satoh | H01G 9/028 361/527 |
| 2016/0163466 A1* | 6/2016 | Naito | H01G 9/15 361/525 |
| 2016/0351340 A1* | 12/2016 | Uka | H01G 9/028 |
| 2018/0068802 A1* | 3/2018 | Uka | H01G 9/028 |

OTHER PUBLICATIONS

English Translation of Chinese Search Report dated Aug. 22, 2018 for the related Chinese Patent Application No. 201680023994.6.

* cited by examiner

ELECTROLYTIC CAPACITOR AND PRODUCTION METHOD FOR SAME

RELATED APPLICATIONS

This application is a continuation of the PCT International Application No. PCT/JP2016/001808, filed on Mar. 29, 2016, which claims the benefit of foreign priority of Japanese patent application No. 2015-092085, filed on Apr. 28, 2015, the contents all of which are incorporated herein by reference.

BACKGROUND

1. Technical Field

The present disclosure relates to an electrolytic capacitor having a conductive polymer layer, and a method for producing the electrolytic capacitor.

2. Description of the Related Art

As small-sized, large capacitance, and low ESR (equivalent series resistance) capacitors, promising candidates are electrolytic capacitors including an anode body on which a dielectric layer is formed and a conductive polymer layer formed so as to cover at least a part of the dielectric layer. The conductive polymer layer includes a conductive polymer such as a π-conjugated polymer.

In Unexamined Japanese Patent Publication No. 2010-87401, a solid electrolytic layer is formed by repeating, twice or more, a film forming treatment in which a solution containing a conductive polymer and a polyanion is applied onto a surface of a dielectric layer to form a conductive polymer film. In this case, it is proposed that a solution having a viscosity higher than a viscosity of a solution used for a first film forming treatment can be used for a film forming treatment after the first film forming treatment.

SUMMARY

An electrolytic capacitor in a first aspect of the present disclosure includes an anode body having a dielectric layer, a first conductive polymer layer covering at least a part of the dielectric layer, and a second conductive polymer layer covering at least a part of the first conductive polymer layer. The first conductive polymer layer includes a first conductive polymer and a first polymer dopant having a sulfonate group. The second conductive polymer layer includes a second conductive polymer and a second polymer dopant having a sulfonate group. A polymerization degree of the first conductive polymer is lower than a polymerization degree of the second conductive polymer.

A method for producing an electrolytic capacitor in a second aspect of the present disclosure is performed according to following steps. A first treatment liquid containing a first conductive polymer, a first polymer dopant having a sulfonate group and a first solvent is prepared by polymerizing a first precursor of the first conductive polymer in the first solvent in presence of the first polymer dopant. A second treatment liquid containing a second conductive polymer, a second polymer dopant having a sulfonate group and a second solvent is prepared by polymerizing a second precursor of the second conductive polymer in the second solvent in presence of the second polymer dopant. Next, an anode body having a dielectric layer is impregnated with the first treatment liquid to form a first conductive polymer layer covering at least a part of the dielectric layer, the first conductive polymer layer including the first conductive polymer and the first polymer dopant. The anode body on which the first conductive polymer layer is formed is impregnated with the second treatment liquid to form a second conductive polymer layer covering at least a part of the first conductive polymer layer, the second conductive polymer layer including the second conductive polymer and the second polymer dopant. The first precursor is subjected to polymerization under a first atmosphere including oxygen when the first treatment liquid is prepared. The second precursor is subjected to polymerization under a second atmosphere that is different in oxygen concentration from the first atmosphere when the second treatment liquid is prepared.

According to the present disclosure, it is possible to reduce ESR and to achieve high electrostatic capacity in the electrolytic capacitor.

DETAILED DESCRIPTION OF EMBODIMENT

When, in forming a first conductive polymer layer and a second conductive polymer layer, covering of a dielectric layer with the first conductive polymer layer or adhesion between the first conductive polymer layer and the second conductive polymer layer are insufficient, an electrostatic capacity becomes low.

Only by changing viscosity of a solution as described in Unexamined Japanese Patent Publication No. 2010-87401, conductivity of a conductive polymer layer cannot be adequately enhanced, and ESR is difficult to be reduced.

In view of the above problem, the present disclosure provides a technique capable of reducing ESR and securing a high electrostatic capacity in an electrolytic capacitor having a conductive polymer layer.

[Electrolytic Capacitor]

An electrolytic capacitor according to one exemplary embodiment of the present disclosure includes an anode body having a dielectric layer, a first conductive polymer layer covering at least a part of the dielectric layer, and a second conductive polymer layer covering at least a part of the first conductive polymer layer. The first conductive polymer layer includes a first conductive polymer and a first polymer dopant having a sulfonate group. Further, the second conductive polymer layer includes a second conductive polymer and a second polymer dopant having a sulfonate group. Here, a polymerization degree of the first conductive polymer is lower than a polymerization degree of the second conductive polymer.

Since, in general, the dielectric layer is formed on a surface of the anode body, many pores or potholes referred to as pits are formed on a surface of the dielectric layer in accordance with a shape of the surface of the anode body, and the surface of the dielectric layer has a complicated shape. Thus, it is difficult to cover an inner wall surface of the pits of the dielectric layer with the first conductive polymer layer. In the present exemplary embodiment, since a first conductive polymer having a relatively low polymerization degree is used for forming the first conductive polymer layer, it becomes easy to cover an inner wall surface of the pits of the dielectric layer. When a covering rate by the first conductive polymer layer is increased, electrostatic polarization tends to occur, and therefore high electrostatic capacity can be secured.

Polymer dopants are used for the first conductive polymer layer and the second conductive polymer layer, so that conductivity of each layer is enhanced, and ESR is reduced. Further, a polymer dopant having a sulfonate group is used for both of the conductive polymer layers, so that affinity between the dopants is enhanced, and thus adhesion between the conductive polymer layers can be improved. Since interface resistance between the conductive polymer layers can be decreased, ESR can be also reduce by improvement of adhesion.

Further, the first conductive polymer having a relatively low polymerization degree is used for the first conductive polymer layer which is an inner layer close to the anode body, so that resistance of the inner layer can be larger than that of the second conductive polymer layer which is an outer layer. Since the resistance of the inner layer is larger than that of the outer layer, a local and rapid reaction hardly occurs in the electrolytic capacitor when the electrolytic capacitor is failed accidentally, and the polymer dopant of inner layer can be mildly insulated. Thus, a rapid short circuit can be suppressed.

Figure 1:
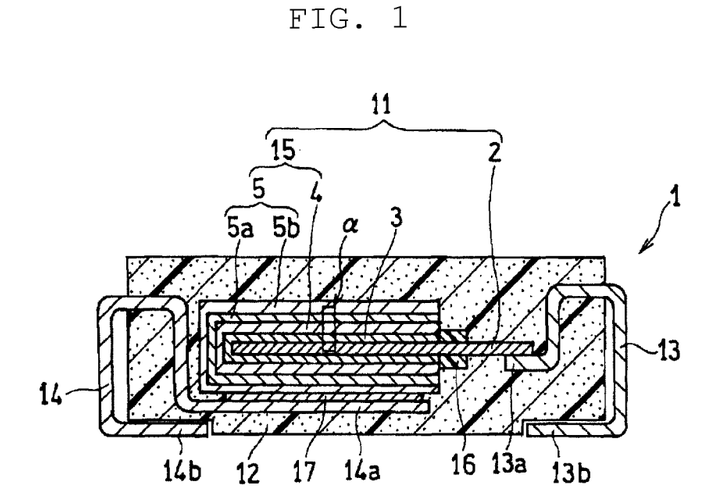
FIG. 1 is a schematic sectional view illustrating an electrolytic capacitor according to one exemplary embodiment of the present disclosure.
Figure 2:
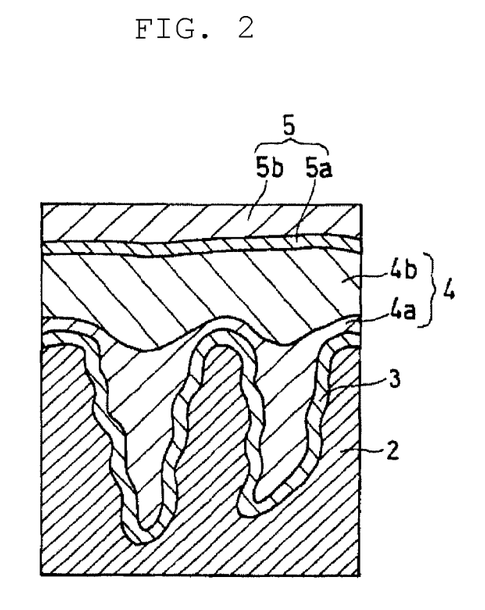
FIG. 2 is an enlarged view illustrating an area surrounded by a solid line α in FIG. 1.

FIG. 1 is a schematic sectional view illustrating an electrolytic capacitor according to one exemplary embodiment of the present disclosure. FIG. 2 is an enlarged view illustrating an area surrounded by a solid line α in FIG. 1. Electrolytic capacitor 1 includes capacitor element 11, resin outer packing 12 that seals capacitor element 11, and anode terminal 13 and cathode terminal 14 that are exposed to the outside of resin outer packing 12. Capacitor element 11 includes foil-like or plate-like anode body 2, dielectric layer 3 covering anode body 2, and cathode portion 15 covering dielectric layer 3. Anode terminal 13 is electrically connected to anode body 2, and cathode terminal 14 is electrically connected to cathode portion 15. Resin outer packing 12 has an almost rectangular parallelepiped outer shape, and therefore electrolytic capacitor 1 also has an almost rectangular parallelepiped outer shape.

Anode body 2 and cathode portion 15 are opposed to each other with dielectric layer 3 interposed between anode body 2 and cathode portion 15. Cathode portion 15 includes conductive polymer layer 4 covering dielectric layer 3 and cathode layer 5 covering conductive polymer layer 4. Cathode layer 5 shown in the drawings has a two-layer structure, and includes carbon layer 5a in contact with conductive polymer layer 4 and silver paste layer 5b covering a surface of carbon layer 5a.

Anode body 2 has an area on which insulating separation part 16 is formed so as to zonally cover a surface of anode body 2, the area being in an end of anode body 2 that protrudes from cathode portion 15 and being adjacent to cathode portion 15. Thus a contact between cathode portion 15 and anode body 2 is restricted at the area. The end of anode body 2 that protrudes from cathode portion 15 is electrically connected to first end 13a of anode terminal 13 by welding or the like. Meanwhile, cathode layer 5 formed as an outermost layer of cathode portion 15 is electrically connected to first end 14a of cathode terminal 14 via conductive adhesive material 17 (e.g., a mixture of a thermosetting resin and metal particles). Second end 13b of anode terminal 13 and second end 14b of cathode terminal 14 are drawn out from side surfaces of resin outer packing 12 which are different from each other, respectively. And second end 13b of anode terminal 13 and second end 14b of cathode terminal 14 each extend to one main flat surface (lower surface in FIG. 1) in an exposed state. The exposed parts of the terminals (anode terminal 13 and cathode terminal 14) on the flat surface are used for, for example, solder connections to a substrate (not shown in the drawings) on which electrolytic capacitor 1 is to be mounted.

Dielectric layer 3 is formed on a part of a surface of a conductive material constituting anode body 2. Specifically, dielectric layer 3 can be formed by anodizing the surface of the conductive material constituting anode body 2. Accordingly, dielectric layer 3 is formed along a surface (including an inner wall surface of pits of an inner surface) of anode body 2 as shown in FIG. 2.

First conductive polymer layer 4a is formed so as to cover dielectric layer 3, and second conductive polymer layer 4b is formed so as to cover first conductive polymer layer 4a. Structures of first conductive polymer layer 4a and second conductive polymer layer 4b are not particularly limited, and may each be a single-layer structure or a multi-layer structure having two or more layers.

First conductive polymer layer 4a does not necessarily cover whole (a whole surface of) dielectric layer 3 and is satisfactory as long as first conductive polymer layer 4a is formed so as to cover at least a part of dielectric layer 3. Similarly, second conductive polymer layer 4b does not necessarily cover whole (a whole surface of) first conductive polymer layer 4a and is satisfactory as long as second conductive polymer layer 4b is formed so as to cover at least a part of first conductive polymer layer 4a. In the example shown in the drawing, first conductive polymer layer 4a and second conductive polymer layer 4b are shown as conductive polymer layer 4. In general, a layer including a conductive polymer, such as first conductive polymer layer 4a, second conductive polymer layer 4b, and conductive polymer layer 4, may be referred to as a solid electrolyte layer.

Dielectric layer 3 is formed along the surface of anode body 2, and therefore irregularities are formed on a surface of dielectric layer 3 in accordance with a shape of the surface of anode body 2. First conductive polymer layer 4a is preferably formed so as to fill such irregularities of dielectric layer 3.

Hereinafter, a configuration of the electrolytic capacitor will be described in more detail.

(Anode Body)

A conductive material having a large surface area can be used as the anode body. Examples of the conductive material include a valve metal, an alloy including a valve metal, and a compound including a valve metal. These materials can be used alone or in combination of two or more materials. As the valve metal, there can be preferably used, for example, titanium, tantalum, aluminum and/or niobium. These metals are suitable as a constituent material of the anode body because oxides of these metals have a high dielectric constant. Examples of the anode body include one obtained by roughening a surface of a base material (e.g., a foil-like or plate-like base material) formed of a conductive material, and a molded body that is prepared from particles of a conductive material or a sintered body obtained by sintering the molded body.

(Dielectric Layer)

The dielectric layer is formed by anodizing, through an anodizing treatment or the like, a conductive material on the surface of the anode body, and therefore the dielectric layer includes an oxide of the conductive material (particularly, a valve metal). For example, when tantalum is used as the valve metal, the dielectric layer includes $Ta_2O_5$, and when aluminum is used as the valve metal, the dielectric layer includes $Al_2O_3$. The dielectric layer is not limited to these examples, and a layer is acceptable as the dielectric layer as long as the layer functions as a dielectric body.

When the anode body is a foil-like or plate-like anode body, and a surface of the anode body is roughened, the dielectric layer is formed along an inner wall surface of pits at a surface of the anode body as shown in FIG. 2.

(First Conductive Polymer Layer and Second Conductive Polymer Layer)

The first conductive polymer layer includes the first conductive polymer and the dopant, and the second conductive polymer layer includes the second conductive polymer and the dopant. In each layer, the dopant may be included in a state of being doped in the first conductive polymer or the second conductive polymer. The dopant may be included in each layer in a state of being bonded to the first conductive polymer or the second conductive polymer.

(First Conductive Polymer and Second Conductive Polymer)

As each of the first conductive polymer and the second conductive polymer, a publicly known polymer, e.g., a π-conjugated conductive polymer, used for an electrolytic capacitor, can be used. Examples of such a conductive polymer include polymers having, as a basic skeleton, for example, polypyrrole, polythiophene, polyfuran, polyaniline, polyacetylene, polyphenylene, polyphenylene vinylene, polyacene, and/or polythiophene vinylene.

Such a polymer includes a homopolymer, a copolymer of two or more kinds of monomers, and derivatives (e.g., a substitute having a substituent) of these polymers. For example, polythiophene includes poly(3,4-ethylenedioxythiophene) and the like. Such a conductive polymer has high conductivity and gives an excellent ESR characteristics. As the first conductive polymer and the second conductive polymer, one conductive polymer may be used alone, or two or more conductive polymers may be used in combination.

As the first conductive polymer and the second conductive polymer, different types of polymers may be used. However, it is preferred to use the same type of conductive polymers or similar type of conductive polymers from the viewpoint of enhancing adhesion between the first conductive polymer layer and the second conductive polymer layer. Examples of the same type of conductive polymers include conductive polymers in which the first conductive polymer and the second conductive polymer include the same monomer units, or monomer units whose structures are similar to each other. The monomer unit which is similar in structure means a monomer unit in which a main skeleton of the monomer unit is the same. Specific example of the case of including the same monomer unit include a case where both of the first conductive polymer and the second conductive polymer include, for example, 3,4-ethylenedioxythiophene as a monomer unit. Specific example of the case of including the monomer unit which is similar in structure include a case where the first conductive polymer includes 3,4-ethylenedioxythiophene as a monomer unit and the second conductive polymer includes thiophene as a monomer unit.

By using a polymer, as the first conductive polymer, which has a lower polymerization degree than the second conductive polymer, the surface of the dielectric layer can be covered in an area as large as possible and a high electrostatic capacity can be secured. Further, since resistance of the first conductive polymer layer becomes larger than resistance of the second conductive polymer layer, a rapid reaction at local area is inhibited from occurring, and therefore a short circuit can also be suppressed. The polymerization degree may be compared, for example, in terms of an average polymerization degree of the conductive polymers or may be compared in terms of a molecular weight (e.g., weight average molecular weight) of the conductive polymers.

A weight average molecular weight $Mw_{p1}$ of the first conductive polymer can be selected to range, for example, from 1,000 to 500,000, inclusive, and may range from 5,000 to 100,000, inclusive. $(Mw_{p2}-Mw_{p1})$ which is a difference between the $Mw_{p1}$ and a weight average molecular weight $Mw_{p2}$ of the second conductive polymer ranges, for example, from 1,000 to 500,000, inclusive, preferably from 10,000 to 500,000, inclusive, and more preferably from 20,000 to 100,000, inclusive.

The first conductive polymer layer may include a third conductive polymer having a relatively high polymerization degree in addition to the first conductive polymer. Examples of the third conductive polymer include the above-mentioned conductive polymers. An average polymerization degree and weight average molecular weight of the third conductive polymer may be nearly equal to the average polymerization degree and weight average molecular weight of the second conductive polymer. $(Mw_{p3}-Mw_{p1})$ which is a difference between the $Mw_{p1}$ and a weight average molecular weight $Mw_{p3}$ of the third conductive polymer can be selected from the above-mentioned range described for $(Mw_{p2}-Mw_{p1})$. A proportion of the first conductive polymer in a total of the first conductive polymer and the third conductive polymer included in the first conductive polymer layer preferably ranges from 50% by mass to 100% by mass, inclusive.

The second conductive polymer layer may include a fourth conductive polymer having a relatively low polymerization degree in addition to the second conductive polymer. Examples of the fourth conductive polymer include the above-mentioned conductive polymers. An average polymerization degree and weight average molecular weight of the fourth conductive polymer may be nearly equal to the average polymerization degree and weight average molecular weight of the first conductive polymer. $(Mw_{p2}-Mw_{p4})$ which is a difference between a weight average molecular weight $Mw_{p4}$ of the fourth conductive polymer and the weight average molecular weight $Mw_{p2}$ of the second conductive polymer can be selected from the above-mentioned range described for $(Mw_{p2}-Mw_{p1})$. A proportion of the second conductive polymer in a total of the second conductive polymer and the fourth conductive polymer included in the second conductive polymer layer preferably ranges from 50% by mass to 100% by mass, inclusive.

(Dopant)

The first conductive polymer layer includes a first polymer dopant having a sulfonate group, and the second conductive polymer layer includes a second polymer dopant having a sulfonate group. The first conductive polymer layer and the second conductive polymer layer each include such polymer dopants, so that conductivity of each layer can be enhanced, and ESR can be reduced.

Structures (or skeletons) of the first polymer dopant and the second polymer dopant are not particularly limited as long as the first polymer dopant and the second polymer dopant each have a sulfonate group. Examples of the first polymer dopant and the second polymer dopant include a homopolymer of a monomer having a sulfonate group (first monomer), a copolymer of the first monomer with another monomer (second monomer), a sulfonated phenolic resin (a sulfonated phenolic novolak resin, etc), and the like. The homopolymer or the copolymer may be a radical polymerization polymer (vinyl polymer, diene polymer or the like)

using radical polymerization, or may be a condensation polymer (polyester or the like) using a condensation reaction.

Examples of the radical polymerization polymer include a homopolymer or a copolymer of a radical polymerization monomer having a sulfonate group (first monomer), and a copolymer of a radical polymerization monomer having a sulfonate group (first monomer) with another copolymerizable monomer (second monomer) are preferred.

Examples of the radical polymerization monomer as the first monomer include a vinyl monomer having a sulfonate group and a diene monomer having a sulfonate group. Examples of the vinyl monomer having a sulfonate group include aliphatic vinyl monomers having a sulfonate group, such as vinylsulfonic acid, allylsulfonic acid, and 2-acrylamido-2-methylpropanesulfonic acid, and aromatic vinyl monomers having a sulfonate group, such as styrene sulfonic acid. Examples of the diene monomer having a sulfonate group include isoprenesulfonic acid. One of these first monomers can be used alone, or two or more of these monomers can be used in combination. Among these first monomers, it is preferred to use at least an aromatic vinyl monomer having a sulfonate group. Specific examples of the first polymer dopant and the second polymer dopant include an aromatic vinyl polymer having a sulfonate group, for example, a homopolymer of an aromatic vinyl monomer having a sulfonate group, and a copolymer of an aromatic vinyl monomer having a sulfonate group with another monomer having a sulfonate group (e.g., aliphatic vinyl monomer having a sulfonate group, and/or a diene monomer having a sulfonate group).

As the other copolymerizable monomer (second monomer) to be copolymerized with the first monomer, a monomer not having an anionic group (vinyl monomer or the like) and the like may be used, or a monomer having an anionic group (phosphate group, phosphonate group, carboxyl group or the like) other than a sulfonate group (vinyl monomer or the like) may be used.

Examples of the polyester having a sulfonate group which is a condensation polymer include polyesters including, as the first monomer, a polycarboxylic acid (dicarboxylic acid or the like) having a sulfonate group and/or a polyol (diol or the like) having a sulfonate group, and, as the second monomer, a polycarboxylic acid (dicarboxylic acid or the like) and a polyol (diol or the like). As the first monomer, a polycarboxylic acid having a sulfonate group is preferably used. As the polycarboxylic acid having a sulfonate group, dicarboxylic acids (aromatic dicarboxylic acid and the like) having a sulfonate group, such as sulfonated phthalic acid, sulfonated isophthalic acid, and sulfonated terephthalic acid, are preferred. As the polycarboxylic acid as the second monomer, a polycarboxylic acid not having a sulfonate group is used, and dicarboxylic acids (aromatic dicarboxylic acid and the like), such as phthalic acid, isophthalic acid, and terephthalic acid, are preferred. As the polyol as the second monomer, a polyol not having a sulfonate group is used, and aliphatic diols ($C_{2-4}$ alkylene glycol and the like), such as ethylene glycol and propylene glycol, are preferred. The first monomer and the second monomer may each be used alone or in combination of two or more monomers.

As the first polymer dopant and the second polymer dopant, one polymer dopant may be used alone, or two or more polymer dopants may be used in combination. For examples, two or more of different radical polymerization polymers may be used in combination, two or more of different condensation polymers may be used in combination, or a radical polymerization polymer and a condensation polymer may be used in combination.

The first polymer dopant and the second polymer dopant preferably include a monomer unit common to both layers or a monomer unit which is similar in structure from the viewpoint of ease of enhancing adhesion between the first conductive polymer layer and the second conductive polymer layer. The monomer unit common to both layers and the monomer unit which is similar in structure may each be any of the first monomer and the second monomer. For example, there are exemplified a case where both of the first polymer dopant and the second polymer dopant are a homopolymer or a copolymer including an aromatic vinyl monomer unit having a sulfonate group and a case where both of the first polymer dopant and the second polymer dopant are a polyester having a sulfonate group.

In the polyester, it is preferred that a monomer unit having a sulfonate group is common between the first polymer dopant and the second polymer dopant, or a monomer unit in the first polymer dopant has a structure similar to a monomer unit in the second polymer dopant. For example, the first polymer dopant may be a polyester including a sulfonated isophthalic acid unit and the second polymer dopant may be a polyester including an aromatic dicarboxylic acid unit having a sulfonate group.

When the first conductive polymer layer includes two or more kinds of first polymer dopants and/or the second conductive polymer layer includes two or more kinds of second polymer dopants, at least one first polymer dopant preferably includes a monomer unit which is the same as or is similar in structure to a monomer unit of at least one second polymer dopant. The first polymer dopant much included in the first conductive polymer layer may be adapted to include a monomer unit which is the same as or is similar in structure to a monomer unit of the second polymer dopant much included in the second conductive polymer layer.

The sulfonation degrees of the first polymer dopant and the second polymer dopant can each be appropriately selected from a range, for example, from 10 mol % to 100 mol %, inclusive, and may range from 20 mol % to 100 mol %, inclusive, or from 10 mol % to 90 mol %, inclusive. The sulfonation degree preferably ranges from 20 mol % to 90 mol %, inclusive and further preferably from 50 mol % to 90 mol %, inclusive or from 70 mol % to 90 mol %, inclusive. The sulfonation degrees of the polymer dopants can be adjusted by adjusting a proportion of the first monomer unit included in the polymer dopants.

It is also preferred that the first polymer dopant has a sulfonation degree nearly equal to a sulfonation degree of the second polymer dopant from the viewpoint of ease of enhancing adhesion between the first conductive polymer layer and the second conductive polymer layer. A difference in sulfonation degree between the first polymer dopant and the second polymer dopant is preferably 10 mol % or less, further preferably 5 mol % or less.

When the first conductive polymer layer includes two or more kinds of first polymer dopants and/or the second conductive polymer layer includes two or more kinds of second polymer dopants, at least one first polymer dopant may have a sulfonation degree nearly equal to a sulfonation degree of at least one second polymer dopant. The first polymer dopant much included in the first conductive polymer layer may be adapted to have a sulfonation degree nearly equal to a sulfonation degree of the second polymer dopant much included in the second conductive polymer layer.

The term sulfonation degree of the polymer dopant in the present specification means a proportion (mol %) of a repeating unit having a sulfonate group (including a salt or ester of the sulfonate group) in whole repeating units constituting a molecule of the polymer dopant. The polymer dopant may have two or more sulfonate groups (including a salt or ester of the sulfonate group) per repeating unit; however, it preferably has one sulfonate group (including a salt or ester of the sulfonate group) per repeating unit.

As the first polymer dopant, polystyrene sulfonic acid and/or polyester having a sulfonate group is preferred from the viewpoint of ease of permeation into pits of the dielectric layer. As the second polymer dopant, a polyester having a sulfonate group is preferred from the viewpoint of ease of enhancing adhesion between the first conductive polymer layer and the second conductive polymer layer.

A weight average molecular weight of each of the first polymer dopant and the second polymer dopant ranges, for example, from 1,000 to 1,000,000, inclusive, preferably from 10,000 to 500,000, inclusive. Use of the polymer dopant having such a molecular weight further facilitates homogenization of the conductive polymer layer. A weight average molecular weight of a sulfonated phenolic resin of the polymer dopant may range from 5,000 to 80,000, inclusive. In the first polymer dopant, the weight average molecular weight more preferably ranges from 10,000 to 500,000, inclusive.

A first polymer dopant having a small molecular weight is preferably used from the viewpoint of ease of increasing a capacitance. A second polymer dopant having a large molecular weight is preferably used from the viewpoint of improving film forming properties and voltage resistance. Accordingly, from these viewpoints, a weight average molecular weight $Mw_{d1}$ of the first polymer dopant and a weight average molecular weight $Mw_{d2}$ of the second polymer dopant may be set so as to satisfy a relation of $Mw_{d1} < Mw_{d2}$.

On the other hand, as the first polymer dopant and the second polymer dopant, dopants having molecular weights as close to each other as possible are preferably used from the viewpoint of further enhancing adhesion between the first conductive polymer layer and the second conductive polymer layer. An absolute value of $(Mw_{d1} - Mw_{d2})$ which is a difference between the weight average molecular weight $Mw_{d1}$ of the first polymer dopant and the weight average molecular weight $Mw_{d2}$ of the second polymer dopant is, for example, 1,000 or less, preferably 500 or less or 300 or less.

A proportion of the first polymer dopant included in the first conductive polymer layer ranges preferably from 10 parts by mass to 1,000 parts by mass, inclusive, further preferably from 50 parts by mass to 200 parts by mass, inclusive, with respect to 100 parts by mass of the first conductive polymer.

A proportion of the second polymer dopant included in the second conductive polymer layer ranges preferably from 10 parts by mass to 1,000 parts by mass, inclusive, further preferably from 50 parts by mass to 200 parts by mass, inclusive, with respect to 100 parts by mass of the second conductive polymer.

In the first polymer dopant and the second polymer dopant, the sulfonate group and another anionic group are not particularly limited as long as these groups can produce an anion in a dissociated state, and these groups may be a salt or ester of the above-mentioned anionic group.

An average thickness of the second conductive polymer layer ranges, for example, from 5 μm to 100 μm, inclusive, preferably from 10 μm to 50 μm, inclusive. A ratio of the average thickness of the second conductive polymer layer to the average thickness of the first conductive polymer layer is, for example, 5 times or more, preferably 10 times or more. When the average thickness and the ratio of the average thickness fall within such a range, strength of the conductive polymer layer can be enhanced.

The first conductive polymer layer and the second conductive polymer layer may each be formed of one layer or may be formed of a plurality of layers. Each of the first conductive polymer layer and the second conductive polymer layer may further include a publicly known additive, and/or a publicly known conductive material (e.g., a conductive inorganic material such as manganese dioxide; and/or a TCNQ complex salt) other than the conductive polymer, as required. A layer to enhance adhesion or the like may be interposed between the dielectric layer and the first conductive polymer layer.

(Cathode Layer)

The carbon layer is satisfactory as long as the carbon layer has conductivity, and the carbon layer can be configured, for example, with use of a conductive carbon material such as graphite. For the silver paste layer, for example, there can be used a composition including a silver powder and a binder resin (e.g., an epoxy resin). The cathode layer is not limited to this configuration and is satisfactory as long as the cathode layer is configured to have a function of power collection.

The anode terminal and the cathode terminal can be configured to include, for example, a metal such as copper or a copper alloy. As a material of the resin outer packing, there can be used, for example, an epoxy resin.

The electrolytic capacitor of the present disclosure is not limited to the electrolytic capacitor having the structure described above, and can be various electrolytic capacitors. Specifically, the present disclosure can also be applied to, for example, a wound electrolytic capacitor and an electrolytic capacitor including a metal powder sintered body as the anode body.

[Method for Producing Electrolytic Capacitor]

An electrolytic capacitor can be produced through following four steps. A first step is preparing a first treatment liquid containing a first conductive polymer, a first polymer dopant and a first solvent. A second step is preparing a second treatment liquid containing a second conductive polymer, a second polymer dopant and a second solvent. A third step is impregnating an anode body having a dielectric layer with the first treatment liquid to form a first conductive polymer layer. And a fourth step is impregnating the anode body obtained in the third step with the second treatment liquid to form a second conductive polymer layer. The method for producing an electrolytic capacitor may include a step of preparing an anode body and a step of forming a dielectric layer on the anode body, and may further include a step (fifth step) of forming a cathode layer. Hereinafter, the steps are described in more detail.

(First Step)

In the first step, a first treatment liquid is prepared by polymerizing a raw material (a precursor of a first conductive polymer (first precursor)) of a first conductive polymer in a first solvent in the presence of a dopant. A first conductive polymer that is bonded to or doped with a dopant is produced by the polymerization. As the dopant, at least a first polymer dopant is used, and another dopant may be used in combination, as required. Examples of the precursor of the first conductive polymer include a monomer that constitutes the first conductive polymer and/or an oligomer in which some monomers are linked to each other.

In the first step, it is preferred that the first precursor is subjected to polymerization under an atmosphere (first atmosphere) including oxygen. An oxygen concentration $C_{o1}$ of the first atmosphere is, for example, 10 vol % or more, preferably 15 vol % or more, and may range from 15 vol % to 40 vol %, inclusive, or from 15 vol % to 30 vol %, inclusive. It becomes easy to adjust the polymerization degree of the first conductive polymer by performing polymerization under a first atmosphere having such an oxygen concentration. A rest part other than oxygen in the first atmosphere may be inert gases (nitrogen, argon, helium and the like). The first step may be performed in atmosphere as the first atmosphere.

As a polymerization method, both chemical oxidation polymerization and electrolytic oxidation polymerization can be employed. The electrolytic oxidation polymerization proceeds by, for example, applying, to a polymerization liquid containing a raw material of the conductive polymer and a dopant, a constant current ranging from 0.05 mA/cm$^2$ to 10 mA/cm$^2$, or a constant voltage ranging from 0.5 V to 10 V. A catalyst may be added to the polymerization liquid in order to accelerate the polymerization. As the catalyst, there can be used, for example, ferrous sulfate and ferric sulfate.

The chemical oxidation polymerization proceeds by mixing a raw material of the conductive polymer with an oxidant in the presence of a dopant. As the oxidant used for the chemical oxidation polymerization, there is used, for example, a persulfate (e.g., ammonium persulfate, sodium persulfate, and potassium persulfate) or a metal sulfonate. At this time, ferrous sulfate and ferric sulfate may be used as a catalyst.

A temperature during the polymerization ranges, for example, from 5° C. to 90° C., inclusive, preferably from 10° C. to 30° C., inclusive. It becomes easy to adjust the polymerization degree of the first conductive polymer by performing the polymerization at such a temperature.

For the polymerization, a solvent (first solvent) for dissolving or dispersing a raw material of the conductive polymer (and a dopant) is used. Examples of the first solvent include water, a water-soluble organic solvent, and a mixture of water and a water-soluble organic solvent. The water-soluble organic solvent is not particularly limited, and examples of the water-soluble organic solvent include acetone, tetrahydrofuran, methanol, ethanol, isopropanol, and/or N-methyl-2-pyrrolidone. When the conductive polymer is synthesized with use of the first solvent, the conductive polymer can be obtained in a state of being dispersed in the first solvent. Then, it is preferred to remove, as required, impurities such as an unreacted monomer, an undoped or excessive dopant, a persulfate, and a catalyst by, for example, dialysis or an ion exchange method.

A third solvent may be added, as required, to a mixture obtained by removing impurities. Examples of the third solvent include water, an organic solvent, and a mixture of water and an organic solvent, and the third solvent may be the same as the first solvent or may be different from the first solvent. Examples of the organic solvent include aliphatic alcohols having 1 to 5 carbon atoms (e.g., aliphatic monools such as methanol, ethanol, propanol, and 1-butanol; and aliphatic polyols such as ethylene glycol and glycerol); aliphatic ketones such as acetone; nitriles such as acetonitrile and benzonitrile; amides such as N,N-dimethylformamide; and/or sulfoxides such as dimethyl sulfoxide. As the third solvent, one solvent may be used alone, or two or more solvents may be used in combination.

The first treatment liquid thus obtained is a dispersion in which the first conductive polymer and the dopant are dispersed in the first solvent or a mixed solvent of the first solvent and the third solvent, or a solution in which the first conductive polymer and the dopant are dissolved in the first solvent or a mixed solvent of the first solvent and the third solvent. The first conductive polymer and the dopant dispersed in the dispersion is preferably particles (or a powder). An average particle size of the particles dispersed in the dispersion preferably ranges from 5 nm to 500 nm, inclusive. The average particle size can be determined, for example, from a particle size distribution obtained by a dynamic light scattering method.

A concentration of solid content in the first treatment liquid ranges, for example, from 0.1% by mass to 10% by mass, inclusive, preferably from 0.5% by mass to 5% by mass, inclusive. A publicly known additive may be added to the first treatment liquid.

The first conductive polymer layer including the first conductive polymer and the third conductive polymer can be formed with use of the first treatment liquid including both of the conductive polymers. Such a first treatment liquid can be obtained by preparing a treatment liquid including the third conductive polymer in the same manner as in a second step described later, and mixing the treatment liquid with a treatment liquid including the first conductive polymer prepared as described above.

(Second Step)

In the second step, a second treatment liquid is prepared by polymerizing a raw material (a precursor of a second conductive polymer (second precursor)) of a second conductive polymer in a second solvent in presence of a dopant. A second conductive polymer that is bonded to or doped with a dopant is produced by the polymerization. As the dopant, at least a second polymer dopant is used, and another dopant may be used in combination, as required.

The second treatment liquid can be prepared in the same manner as in the first step except that a raw material of the second conductive polymer and the second polymer dopant are used in place of the raw material of the first conductive polymer and the first polymer dopant, and an oxygen concentration of an atmosphere (second atmosphere) during polymerization is different from the oxygen concentration of the first atmosphere. The second solvent can be appropriately selected from those exemplified for the first solvent.

In the second step, the second precursor is subjected to polymerization in the presence of the dopant under the second atmosphere, but the oxygen concentration of the second atmosphere is preferably different from the oxygen concentration of the first atmosphere. The second atmosphere may include oxygen and may not include oxygen. It becomes easy to control the polymerization degree of the conductive polymer (that is, a length of a molecular chain of the conductive polymer) by performing the polymerization under such a second atmosphere. For example, the molecular chain of the conductive polymer is shortened and it becomes easy to enter etching pits, so that a capacitance can be easily achieved. A conductive polymer having high voltage resistance can be obtained when the polymerization is performed in an atmosphere of a high oxygen concentration. On the other hand, a conductive polymer having high conductivity can be obtained when the polymerization is performed in an atmosphere of a low oxygen concentration. A combination of these conditions enables to attain a capacitor having high voltage resistance and low ESR. Particularly, when an oxygen concentration of the first atmosphere which is higher than an oxygen concentration of the second atmosphere is used, a capacitor having high voltage resistance and low ESR is easily obtained.

An oxygen concentration $C_{o2}$ of the second atmosphere may be higher than the oxygen concentration $C_{o1}$ of the first atmosphere. However, it is preferred that the oxygen concentration $C_{o1}$ of the first atmosphere is higher than the oxygen concentration $C_{o2}$ of the second atmosphere. The oxygen concentration $C_{o2}$ of the second atmosphere is, for example, 30 vol % or less, preferably 10 vol % or less, and further preferably 5 vol % or less. A rest part other than oxygen in the second atmosphere is preferably inert gases (nitrogen, argon and/or helium). $(C_{o1}-C_{o2})$ which is a difference between the oxygen concentration $C_{o1}$ of the first atmosphere and the oxygen concentration $C_{o2}$ of the second atmosphere is preferably 5 vol % or more, further preferably 10 vol % or more, or 15 vol % or more.

In the second step, a third solvent may be added as with the first step after removing impurities from a polymerization liquid obtained by the polymerization. The second treatment liquid is a dispersion in which the second conductive polymer and the dopant are dispersed in the second solvent or a mixed solvent of the second solvent and the third solvent, or a solution in which the second conductive polymer and the dopant are dissolved in the second solvent or a mixed solvent of the second solvent and the third solvent. An average particle size of particles (or a powder) dispersed in the dispersion may have the range described for the first treatment liquid.

A concentration of solid content in the second treatment liquid ranges, for example, from 0.1% by mass to 10% by mass, inclusive, preferably from 2% by mass to 7% by mass, inclusive. A publicly known additive may be added to the second treatment liquid.

The second conductive polymer layer including the second conductive polymer and the fourth conductive polymer can be formed with use of the second treatment liquid including both of the conductive polymers. Such a second treatment liquid can be obtained by preparing a treatment liquid including the fourth conductive polymer in the same manner as in the first step, and mixing the treatment liquid with a treatment liquid including the second conductive polymer prepared as described above.

(Step of Preparing Anode Body)

In the step of preparing an anode body, an anode body is formed by a publicly known method according to a kind of the anode body. The anode body can be prepared by, for example, roughening a surface of a foil-like or plate-like base material formed of a conductive material. The roughening is satisfactory as long as irregularities are formed on the surface of the base material and may be performed, for example, by subjecting the surface of the base material to etching (e.g., electrolytic etching) or by depositing particles of the conductive material on the surface of the base material using a gas phase method such as vapor deposition. The step of preparing an anode body is performed prior to the third step.

(Step of Forming Dielectric Layer)

The dielectric layer is formed by anodizing a surface of the anode body. The anodization can be performed by a publicly known method, for example, an anodizing treatment. The anodizing treatment can be performed by, for example, immersing the anode body in a anodizing liquid to impregnate, with the anodizing liquid, the surface (a more inside surface, i.e., an inner wall surface of pores or pits) of the anode body, and applying a voltage between the anode body as an anode and a cathode immersed in the anodizing liquid. As the anodizing liquid, it is preferred to use, for example, an aqueous solution of phosphoric acid, an aqueous solution of ammonium phosphate, or an aqueous solution of ammonium adipate. The step of forming a dielectric layer is performed prior to the third step.

(Third Step)

In the third step, the anode body having a dielectric layer is impregnated with the first treatment liquid obtained in the first step to form a first conductive polymer layer. By the third step, the first conductive polymer layer is formed so as to cover at least a part of the dielectric layer.

In the third step, for example, the dielectric layer-formed anode body is immersed in the first treatment liquid or the first treatment liquid is added dropwise to the dielectric layer-formed anode body. The first treatment liquid is impregnated by the immersion or the dropwise addition, into the surface (a more inside surface, i.e., an inner wall surface of pores or pits on which the dielectric layer has been formed) of the anode body provided with the dielectric layer formed. After impregnating with the first treatment liquid, the anode body may be dried as required. During the drying, the anode body may be heated as required. The third step allows the first conductive polymer and the dopant to adhere to the surface of the anode body provided with the dielectric layer formed, thus forming the first conductive polymer layer.

(Fourth Step)

The fourth step can be performed by a procedure which is the same as or is similar to the procedure of the third step except that the anode body treated with the first treatment liquid is used, and the second treatment liquid obtained in the second step is used in place of the first treatment liquid. By the fourth step, the second conductive polymer layer is formed so as to cover at least a part of the first conductive polymer layer.

(Fifth Step)

In the fifth step, a cathode layer is formed by sequentially stacking a carbon layer and a silver paste layer on the surface (preferably of the conductive polymer layer formed) of the anode body obtained in the fourth step.

EXAMPLES

Hereinafter, the present disclosure is specifically described with reference to examples and comparative examples. The present disclosure, however, is not limited to the examples below.

Example 1

Electrolytic capacitor 1 shown in FIG. 1 was produced in the manner described below, and characteristics of the electrolytic capacitor were evaluated.

(1) Step of Preparing Anode Body 2

Both surfaces of an aluminum foil (thickness: 100 µm) as a base material were roughened by etching to produce anode body 2.

(2) Step of Forming Dielectric Layer 3

A part on one end side of anode body 2 (a part from a separation part to the one end) was immersed in an anodizing liquid, and a 70 V DC voltage was applied for 20 minutes to form dielectric layer 3 including aluminum oxide.

(3) Step of Preparing a First Treatment Liquid

A 3,4-ethylenedioxythiophene monomer was added under stirring to an aqueous solution of polystyrene sulfonic acid (PSS), and then oxidants (iron(III) sulfate and sodium persulfate) were added to the resulting mixture to carry out chemical oxidation polymerization. The chemical oxidation polymerization was performed in an air atmosphere (oxygen concentration: 20 vol %). The resulting polymerization liquid was subjected to filtration by ion-exchange equipment to remove impurities. Thus, a solution was obtained which contained poly(3,4-ethylenedioxythiophene) (PEDOT) as a first conductive polymer, and PSS as a first polymer dopant. Pure water was added to the obtained solution, and the resulting mixture was homogenized by a high-pressure homogenizer and was further subjected to filtration by a filter to prepare a first treatment liquid in a state of a dispersion liquid. A content of a solid content in the first treatment liquid was 1.5% by mass, and a proportion of the first polymer dopant was 100 parts by mass with respect to 100 parts by mass of PEDOT.

(4) Step of Preparing a Second Treatment Liquid

A 3,4-ethylenedioxythiophene monomer was added under stirring to an aqueous solution of PSS, and then oxidants (iron(III) sulfate and sodium persulfate) were added to the resulting mixture to carry out chemical oxidation polymerization. The chemical oxidation polymerization was performed in an argon atmosphere (oxygen concentration: 0 vol %). The resulting polymerization liquid was subjected to filtration by ion-exchange equipment to remove impurities. Thus, a solution was obtained which contained poly(3,4-ethylenedioxythiophene) (PEDOT) as a second conductive polymer, and PSS as a second polymer dopant. Pure water was added to the obtained solution, and the resulting mixture was homogenized by a high-pressure homogenizer and was further subjected to filtration by a filter to prepare a second treatment liquid in a state of a dispersion liquid.

A content of a solid content in the second treatment liquid was 4.0% by mass, and a proportion of the second polymer dopant was 100 parts by mass with respect to 100 parts by mass of PEDOT.

From a difference between particle sizes in the first treatment liquid and the second treatment liquid or a difference between settling velocities in subjecting these treatment liquids to centrifugal separation, it was confirmed that a polymerization degree of the first conductive polymer in the first treatment liquid is lower than a polymerization degree of the second conductive polymer in the second treatment liquid.

(5) Step of Forming First Conductive Polymer Layer 4a

Anode body 2, on which dielectric layer 3 obtained in the above step (2) was formed, was immersed in the first treatment liquid prepared in the above step (3), then taken out from the first treatment liquid, and further dried at 120° C. for a period ranging from 10 minutes to 30 minutes. The immersion in the first treatment liquid and the drying were repeated again, so that first conductive polymer layer 4a was formed so as to cover a surface of dielectric layer 3.

(6) Step of Forming Second Conductive Polymer Layer 4b

Anode body 2 treated in the above step (5) was immersed in the second treatment liquid prepared in the above step (4), was taken out from the second treatment liquid, and further dried at 120° C. for a period ranging from 10 minutes to 30 minutes. The immersion in the second treatment liquid and the drying were alternately repeated twice, so that second conductive polymer layer 4b was formed so as to cover a surface of first conductive polymer layer 4a. Thus, first conductive polymer layer 4a and second conductive polymer layer 4b were formed so as to cover the surface of dielectric layer 3.

(7) Step of Forming Cathode Layer 5

Anode body 2 obtained in the above step (6) was immersed in a dispersion liquid in which graphite particles were dispersed in water, was taken out from the dispersion liquid, and was dried to form carbon layer 5a on at least a surface of second conductive polymer layer 4b. Drying was carried out at a temperature ranging from 130° C. to 180° C. for a period ranging from 10 minutes to 30 minutes. Then, a silver paste containing silver particles and a binder resin (epoxy resin) was applied onto a surface of carbon layer 5a, and the layer coated with the silver paste was heated at a temperature ranging from 150° C. to 200° C. for a period ranging from 10 minutes to 60 minutes to cure the binder resin, so that silver paste layer 5b was formed. Thus, cathode layer 5 composed of carbon layer 5a and silver paste layer 5b was formed. As described above, capacitor element 11 was produced.

(8) Assembling of Electrolytic Capacitor

Cathode layer 5 of capacitor element 11, obtained in the above step (7), was joined with one end (first end) 14a of cathode terminal 14 by conductive adhesive 17. The other end of anode body 2, which protruded from capacitor element 11, was joined with one end (first end) 13a of anode terminal 13 by laser welding. Next, resin outer packing 12 formed of an insulating resin was formed around capacitor element 11 by a transfer molding method. Then, the other end (second end) 13b of anode terminal 13 and the other end (second end) 14b of cathode terminal 14 were in a state of being drawn out from resin outer packing 12. Thus, electrolytic capacitor 1 (A1) was completed. In the same manner as described above, a total of 250 electrolytic capacitors 1 were produced.

(9) Evaluation

The following evaluations (a) to (c) were performed using a produced electrolytic capacitor.

(a) Electrostatic Capacity and ESR

An electrostatic capacity (initial electrostatic capacity) (μF) at a frequency of 120 Hz was measured for the electrolytic capacitor using an LCR meter for four-terminal measurement. An ESR value (initial ESR value) (mΩ) at a frequency of 100 kHz was measured for the electrolytic capacitor using an LCR meter for 4-terminal measurement. The electrostatic capacity and the ESR value were measured for each randomly selected 120 electrolytic capacitors, and average values for the electrostatic capacity and the ESR value were calculated.

(b) Change Rate in Moisture Resistance

The electrolytic capacitor was maintained for 500 hours under an atmosphere of 60° C. and 90% RH. Then, in the same manner as in the above (a), the ESR values were measured and an average value of the ESR values was determined. A difference between the average value and the initial ESR value was determined, and a ratio (%) of the difference to the initial ESR (i.e., change rate) was taken as a reference index of the moisture resistance.

(c) Leakage Current (LC)

A voltage of 10 V was applied between anode body 2 and cathode layer 5 of the electrolytic capacitor and leakage current was measured after 40 seconds of the application. Then, an electrolytic capacitor having a leakage current amount exceeding 100 μA was determined to be defective, and an LC defective rate (%) was calculated in each of the examples and comparative examples to take the rate as a reference index of the leakage current.

Comparative Example 1

A first treatment liquid was prepared in the same manner as in Example 1 except for performing chemical oxidation polymerization under an argon atmosphere (oxygen concentration: 0 vol %) in step (3) of Example 1. A content of a solid content in the first treatment liquid was 4.0% by mass, and a proportion of the first polymer dopant was 100 parts by mass with respect to 100 parts by mass of PEDOT.

A second treatment liquid was prepared in the same manner as in Example 1 except for performing chemical oxidation polymerization under an air atmosphere (oxygen concentration: 20 vol %) in step (4) of Example 1. A content rate of a solid content in the second treatment liquid was 1.5% by mass, and a proportion of the second polymer dopant was 100 parts by mass with respect to 100 parts by mass of PEDOT. It was confirmed in the same manner as in Example 1 that a polymerization degree of the first conductive polymer in the first treatment liquid is higher than a polymerization degree of the second conductive polymer in the second treatment liquid. An electrolytic capacitor was produced in the same manner as in Example 1 except for using the obtained first treatment liquid and second treatment liquid, and the electrolytic capacitor was evaluated.

Comparative Example 2

An electrolytic capacitor was produced in the same manner as in Example 1 except for using a second treatment liquid prepared in the same manner as in Comparative Example 1, and the electrolytic capacitor was evaluated. It was confirmed in the same manner as in Example 1 that an average polymerization degree of the first conductive polymer in the first treatment liquid is equal to a polymerization degree of the second conductive polymer in the second treatment liquid.

Example 2

A second treatment liquid was prepared in the same manner as in Example 1 except for performing chemical oxidation polymerization under an atmosphere of a mixed gas (oxygen concentration: 5 vol %) containing argon and oxygen in a volume ratio of 95:5 in step (4) of Example 1. A content of a solid content in the second treatment liquid was 4.0% by mass, and a proportion of the second polymer dopant was 100 parts by mass with respect to 100 parts by mass of PEDOT. It was confirmed in the same manner as in Example 1 that a polymerization degree of the first conductive polymer in the first treatment liquid is lower than a polymerization degree of the second conductive polymer in the second treatment liquid. An electrolytic capacitor was produced in the same manner as in Example 1 except for using the obtained second treatment liquid, and the electrolytic capacitor was evaluated.

Example 3

A first treatment liquid was prepared in the same manner as in Example 1 except for performing chemical oxidation polymerization under an atmosphere of a mixed gas (oxygen concentration: 5 vol %) containing argon and oxygen in a volume ratio of 95:5 in step (3) of Example 1. A content of a solid content in the first treatment liquid was 1.5% by mass, and a proportion of the first polymer dopant was 100 parts by mass with respect to 100 parts by mass of PEDOT. It was confirmed in the same manner as in Example 1 that a polymerization degree of the first conductive polymer in the first treatment liquid is lower than a polymerization degree of the second conductive polymer in the second treatment liquid. An electrolytic capacitor was produced in the same manner as in Example 1 except for using the obtained first treatment liquid, and the electrolytic capacitor was evaluated.

Example 4

A first treatment liquid was prepared in the same manner as in Example 1 except for performing chemical oxidation polymerization under an atmosphere of a mixed gas (oxygen concentration: 50 vol %) containing argon and oxygen in a volume ratio of 50:50 in step (3) of Example 1. A content of a solid content in the first treatment liquid was 1.5% by mass, and a proportion of the first polymer dopant was 100 parts by mass with respect to 100 parts by mass of PEDOT.

A second treatment liquid was prepared in the same manner as in Example 1 except for performing chemical oxidation polymerization under an atmosphere of a mixed gas (oxygen concentration: 10 vol %) containing argon and oxygen in a volume ratio of 90:10 in step (4) of Example 1. A content of a solid content in the second treatment liquid was 4.0% by mass, and a proportion of the second polymer dopant was 100 parts by mass with respect to 100 parts by mass of PEDOT. It was confirmed in the same manner as in Example 1 that a polymerization degree of the first conductive polymer in the first treatment liquid is lower than a polymerization degree of the second conductive polymer in the second treatment liquid. An electrolytic capacitor was produced in the same manner as in Example 1 except for using the obtained first treatment liquid and second treatment liquid, and the electrolytic capacitor was evaluated.

Example 5

A first treatment liquid was prepared in the same manner as in Example 1 except for using polyester having a sulfonate group as the first polymer dopant in place of PSS in step (3) of Example 1. A content of a solid content in the first treatment liquid was 1.5% by mass, and a proportion of the first polymer dopant was 100 parts by mass with respect to 100 parts by mass of PEDOT.

As the polyester having a sulfonate group, one including a sulfonated isophthalic acid unit as a first monomer unit having a sulfonate group, an isophthalic acid unit, and an ethylene glycol unit, was used. A sulfonation degree of the polyester having a sulfonate group was 20 mol %, and a weight average molecular weight of the polyester was 50,000. It was confirmed in the same manner as in Example 1 that a polymerization degree of the first conductive polymer in the first treatment liquid is lower than a polymerization degree of the second conductive polymer in the second treatment liquid. An electrolytic capacitor was produced in the same manner as in Example 1 except for using the obtained first treatment liquid, and the electrolytic capacitor was evaluated.

Comparative Example 3

A first treatment liquid was prepared in the same manner as in Example 5 except for performing chemical oxidation polymerization under an argon atmosphere (oxygen concentration: 0 vol %). A content of a solid content in the first treatment liquid was 4.0% by mass, and a proportion of the first polymer dopant was 100 parts by mass with respect to 100 parts by mass of PEDOT. A sulfonation degree of the polyester having a sulfonate group serving as the first polymer dopant was 20 mol %, and a weight average molecular weight of the polyester was 45,000. It was confirmed in the same manner as in Example 1 that a polymerization degree of the first conductive polymer in the first treatment liquid is higher than a polymerization degree of the second conductive polymer in the second treatment liquid. An electrolytic capacitor was produced in the same manner as in Example 1 except for using the obtained first treatment liquid, and the electrolytic capacitor was evaluated.

Example 6

A treatment liquid (first treatment liquid a) containing PEDOT and PSS was prepared in the same manner as in step (3) of Example 1. A treatment liquid (first treatment liquid b) containing PEDOT and polyester having a sulfonate group was prepared in the same manner as in the case of the first treatment liquid of Example 5. A first treatment liquid was prepared by mixing first treatment liquid a and first treatment liquid b in a mass ratio of 1:1.

A treatment liquid (second treatment liquid a) containing PEDOT and PSS was prepared in the same manner as in step (4) of Example 1. A treatment liquid (second treatment liquid b) containing PEDOT and polyester having a sulfonate group was prepared in the same manner as in the case of the first treatment liquid of Comparative Example 3. A second treatment liquid was prepared by mixing second treatment liquid a and second treatment liquid b in a mass ratio of 1:1. It was confirmed in the same manner as in Example 1 that a polymerization degree of the first conductive polymer in the first treatment liquid is lower than a polymerization degree of the second conductive polymer in the second treatment liquid. An electrolytic capacitor was produced in the same manner as in Example 1 except for using the obtained first treatment liquid and second treatment liquid, and the electrolytic capacitor was evaluated.

Example 7

A treatment liquid (first treatment liquid a) containing PEDOT and PSS was prepared in the same manner as in step (4) of Example 1. First treatment liquid b containing PEDOT and polyester having a sulfonate group was prepared in the same manner as in Example 6. A first treatment liquid was prepared by mixing first treatment liquid a and first treatment liquid b in a mass ratio of 1:1. A second treatment liquid was prepared in the same manner as in Example 6. It was confirmed in the same manner as in Example 1 that a polymerization degree of the first conductive polymer in the first treatment liquid is lower than a polymerization degree of the second conductive polymer in the second treatment liquid. An electrolytic capacitor was produced in the same manner as in Example 1 except for using the obtained first treatment liquid and second treatment liquid, and the electrolytic capacitor was evaluated.

Reference Example 1

A first treatment liquid was prepared in the same manner as in Example 7. A second treatment liquid was prepared in the same manner as in the above first treatment liquid. An electrolytic capacitor was produced in the same manner as in Example 1 except for using the obtained first treatment liquid and second treatment liquid, and the electrolytic capacitor was evaluated.

Table 1 shows evaluation results of Examples 1 to 7, Reference Example 1 and Comparative Examples 1 to 3. A1 to A7 each denote Examples 1 to 7, B1 to B3 each denote Comparative Examples 1 to 3, and C1 denotes Reference Example 1.

TABLE 1

| | Electrostatic Capacity (µF) | ESR (mΩ) | Change Rate in Moisture Resistance (%) | LC (%) |
|---|---|---|---|---|
| A1 | 3.3 | 29.0 | 65.0 | 2.1 |
| A2 | 3.4 | 33.0 | 77.0 | 2.2 |
| A3 | 3.2 | 35.0 | 72.0 | 1.8 |
| A4 | 3.5 | 37.0 | 66.0 | 2.0 |
| A5 | 3.1 | 41.0 | 52.0 | 1.7 |
| A6 | 3.4 | 34.0 | 51.0 | 0.6 |
| A7 | 3.1 | 40.0 | 44.0 | 1.1 |
| C1 | 3.1 | 42.0 | 85.0 | 1.2 |
| B1 | 0.9 | 85.0 | 85.0 | 6.5 |
| B2 | 3.3 | 28.0 | 152.0 | 6.1 |
| B3 | 0.8 | 122.0 | 109.0 | 5.2 |

As shown in Table 1, in Examples, higher electrostatic capacity is obtained and the ESR is suppressed low as compared with Comparative Examples. In Examples, excellent moisture resistance is achieved and leakage current is suppressed. From the viewpoint of high electrostatic capacity and low ESR, as with Example 7 and Reference Example 1, two or more kinds of conductive polymers obtained by polymerizing a precursor under atmospheres of different oxygen concentration may be used as a conductive polymer included in the first conductive polymer layer and/or the second conductive polymer layer.

The electrolytic capacitor according to the present disclosure can be used for various uses in which the high electrostatic capacity and a reduction of ESR are required.

What is claimed is:

1. An electrolytic capacitor comprising:
   an anode body having a dielectric layer,
   a first conductive polymer layer covering at least a part of the dielectric layer, and
   a second conductive polymer layer covering at least a part of the first conductive polymer layer,
   wherein:
   the first conductive polymer layer includes a first conductive polymer and a first polymer dopant having a sulfonate group,
   the second conductive polymer layer includes a second conductive polymer and a second polymer dopant having a sulfonate group, and
   a polymerization degree of the first conductive polymer is lower than a polymerization degree of the second conductive polymer.

2. The electrolytic capacitor according to claim 1, wherein the first polymer dopant includes a monomer unit which is same as or is similar in a structure to a monomer unit included in the second polymer dopant.

3. The electrolytic capacitor according to claim 1, wherein each of a sulfonation degree of the first polymer dopant and a sulfonation degree of the second polymer dopant ranges from 10 mol % to 90 mol %, inclusive.

4. The electrolytic capacitor according to claim 1, wherein each of the first polymer dopant and the second polymer dopant is a polyester having a sulfonate group.

5. A method for producing an electrolytic capacitor, the method comprising:
   preparing a first treatment liquid containing a first conductive polymer, a first polymer dopant having a sulfonate group and a first solvent by polymerizing a first precursor of the first conductive polymer in the first solvent in presence of the first polymer dopant, preparing a second treatment liquid containing a second conductive polymer, a second polymer dopant having a sulfonate group and a second solvent by polymerizing a second precursor of the second conductive polymer in the second solvent in presence of the second polymer dopant, impregnating an anode body having a dielectric layer with the first treatment liquid to form a first conductive polymer layer covering at least a part of the dielectric layer, the first conductive polymer layer including the first conductive polymer and the first polymer dopant, and impregnating the anode body on which the first conductive polymer layer is formed with the second treatment liquid to form a second conductive polymer layer covering at least a part of the first conductive polymer layer, the second conductive polymer layer including the second conductive polymer and the second polymer dopant, wherein:

the first precursor is subjected to polymerization under a first atmosphere including oxygen when the first treatment liquid is prepared, and the second precursor is subjected to polymerization under a second atmosphere that is different in oxygen concentration from the first atmosphere when the second treatment liquid is prepared.

6. The method for producing an electrolytic capacitor according to claim 5, wherein an oxygen concentration of the first atmosphere is higher than an oxygen concentration of the second atmosphere.

7. The method for producing an electrolytic capacitor according to claim 5, wherein:

an oxygen concentration of the first atmosphere is 15 vol % or more, and an oxygen concentration of the second atmosphere is 5 vol % or less.

8. The method for producing an electrolytic capacitor according to claim 5, wherein the first polymer dopant includes a monomer unit which is same as or is similar in a structure to a monomer unit included in the second polymer dopant.

9. The electrolytic capacitor according to claim 1, wherein a weight average molecular weight of the first conductive polymer is 1,000 or more and 500,000 or less.

10. The electrolytic capacitor according to claim 1, wherein a difference between a weight average molecular weight of the first conductive polymer and a weight average molecular weight of the second conductive polymer is 1,000 or more and 500,000 or less.

11. The electrolytic capacitor according to claim 1, wherein the first conductive polymer is at least one selected from polypyrrole, polythiophene, polyfuran, polyaniline, polyacetylene, polyphenylene, polyphenylene vinylene, polyacene, polythiophene vinylene, and derivatives of these polymers.

12. The electrolytic capacitor according to claim 1, wherein the second conductive polymer is at least one selected from polypyrrole, polythiophene, polyfuran, polyaniline, polyacetylene, polyphenylene, polyphenylene vinylene, polyacene, polythiophene vinylene, and derivatives of these polymers.

13. The electrolytic capacitor according to claim 1, wherein the first polymer dopant and the second polymer dopant is same.

14. The electrolytic capacitor according to claim 1, wherein the first polymer dopant and the second polymer dopant is polystyrene sulfonic acid.

* * * * *